United States Patent Office 3,547,957
Patented Dec. 15, 1970

3,547,957
WATER-SOLUBLE ANTHRAQUINONE DYESTUFFS CONTAINING THIOSULFONIC ACID GROUPS
Djavad Razavi, 29 Avenue de Lamballe, Paris, France
No Drawing. Continuation of application Ser. No. 471,725, July 13, 1965. This application May 22, 1969, Ser. No. 828,441
Claims priority, application France, July 18, 1964, 982,217; July 22, 1964, 982,560
Int. Cl. C09b 1/32; D06p 1/24
U.S. Cl. 260—374
6 Claims

ABSTRACT OF THE DISCLOSURE

Water-soluble dyestuffs having excellent fastness to light and wet tests, containing free thiosulphonic acid groups and alkali metal salts of such dyestuffs. These dyestuffs are useful in dyeing cellulosic fibres and are prepared by treating a sulphochloride of an azo, anthraquinone, phthalocyanine or dioxazine dyestuff in an aqueous medium at a temperature of from 0° C. to 100° C. with an alkali metal sulphide, an alkali metal hydrosulphide or thiourea. The salt which is formed is converted to the free acid by acidification.

---

This application is a continuation of copending application Ser. No. 471,725 filed July 13, 1965, and now abandoned.

The present invention concerns new dyestuffs, methods for their preparation and their applications.

According to the present invention new dyestuffs are provided which are characterised by the presence in their molecules of at least one thiosulphonic group as the free acid or as a salt.

The thiosulphonic group has the formula —SO$_2$SH and it can be introduced into the molecule of the dyestuff or of one of its intermediate products, for example, by the action of an alkali metal sulphide, an alkali metal hydrosulphide or thiourea on a sulphochloride of the dyestuff or one of its intermediate products.

It has been found according to the present invention that dyestuffs containing such a group are capable of being fixed on textile fibres, especially on fibres consisting of natural or regenerated cellulose, by a treatment at elevated temperature, thus providing with very good yields dyeings or printings which are remarkably fast to washing and to other wet tests.

The dyestuffs which may be used for carrying out the invention may belong to very diverse classes, such as for example the following: azo, anthraquinone, azine, oxazine, nitro, phthalocyanine, perinone, naphthoyleneimidazole, perylenetetracarbonimide, and quinacridone dyestuffs. They may be metallisable or metalliferous and contain metals such as copper, chromium, cobalt, nickel, manganese or iron; they may contain besides the thiosulphonic group other water-solubilising groups such as the —SO$_3$H, —COOH, —SO$_2$H or —OSO$_3$H groups or reactive groups such as vinylsulphone, β-chloroethylsulphonamido, γ-chloro-β-hydroxypropylsulphonamido, 2,6-dichloro-1,3,5-triazinyl, 2-chloro-1,3,5-triazinyl, 2,4-dichloro-pyrimidyl, 2,4,5-trichloropyrimidyl, 2-chlorobenzothiazyl, 1,4-dichloro-phthalazinyl, or 2,3-dichloroquinoxalinyl groups.

The introduction of the sulphochloride group into a dyestuff may be effected according to the general known methods, such as sulphochlorination by chlorosulphonic acid; conversion of a sulphonic group into a sulphochloride group by the action of chlorosulphonic acid, thionyl chloride, phosphorous pentachloride, phosphorus trichloride and chlorine or analogous reagents; or oxidation by chlorine of a disulphide group. This introduction may be made on the dyestuff itself or on an intermediate product such as a coupling compound, for example, which will subsequently be converted into dyestuff.

The conversion of the —SO$_2$Cl group into a thiosulphonic group may be carried out, for example, with an aqueous solution of alkali metal sulphide or alkali metal hydrosulphide at a fairly low temperature, for example between 0° C. and 100° C., preferably between 0° C., and 30° C., under conditions such that there is always a slight excess of sodium sulphide in the solution. In general, a stoichiometric quantity of sodium sulphide is sufficient to convert the —SO$_2$Cl into a —SO$_2$SNa group; the latter is converted into the group —SO$_2$SH by acidification.

This conversion of the SO$_2$Cl group into a thiosulphonic group may also be effected by adding thiourea to an aqueous suspension of sulphochloride at a temperature between 0° C. and 100° C., preferably between 0° C. and 60° C., and neutralising the liberated hydrochloric acid by means of an alkali such as a solution of sodium hydroxide or carbonate. The sulphochloride which is generally insoluble in water at the beginning dissolves as the reaction progresses. The reaction period may vary from some minutes to some hours, the end of the reaction being generally able to be found by the solubility of the conversion product obtained in water.

The dyestuffs according to the invention are stable at ordinary room temperature in aqueous slightly acid, alkaline or neutral medium, which enables them to be dried as the free acids, or as salts and their alkaline solution to be kept without deterioration. They may be applied to the fibres by dyeing, foularding or printing. For this purpose aqueous solutions or suspensions of these dyestuffs, possibly thickened, to which solvents, hydrotropes, wetting agents, dispersing agents, stabilisers, acid-absorbing agents or other auxiliary products may be added, are applied by the usual processes to the fibres, which may be of any form such as threads, fabrics, wadding, bobbins, cakes. The addition of products yielding sulphur such as thiourea or thioacetamide, to the dye or foularding baths or to the printing pastes is especially advantageous. After possible drying, the material is then subjected to a heat treatment at a temperature between 100° C. and 220° C. During this treatment the dyestuff is fixed on the fibre with a high yield and, in numerous cases, almost quantitative yield, and thus provides colorations having excellent resistance to wet tests.

The following examples, in which the parts are parts by weight unless the contrary is indicated, are purely illustrative and the invention is not limited thereto.

EXAMPLE 1

12 parts of copper phthalocyanine are added to 60 parts by volume of chlorosulphonic acid, with external cooling, then the mixture is heated to 135° C. in a period of half an hour and maintained for 4 hours at a temperature of 135–140° C. It is then cooled to 60° C. and 20 parts by volume of thionyl chloride are added, the mixture is heated to 95° C. in a period of half an hour and maintained for one and a half hours at 92–95° C. It is cooled, poured into 250 parts of a saturated salt solution and 500 parts of ice, and the solid is filtered off and the filter cake washed with ice water. This cake is suspended in 200 parts of ice water, the pH adjusted to neutrality at 0° C. by means of a 2 N solution of sodium carbonate, and 35 parts of crystalline sodium sulphide are added. The temperature is maintained at between 0° C. and 10° C. for 40 minutes, and the product is acidified with hydrochloric acid until Congo red changes colour therein, and the solid is filtered off, washed with cold water and dried under vacuum at 50° C. A deep blue powder is obtained which dyes natural or regenerated cellulose, in the presence of an acid-absorbent and urea, giving on this fibre by heat-fixing green shades which are very fast to wet tests. The fastness to washing may be improved further by adding thiourea to the foularding solution or to the printing paste of the dyestuff.

The application is effected, for example, in the following way. A foularding bath is prepared containing one part of a dyestuff, 5 parts of urea, 1.5 parts of thiourea, 15 parts of water. A cotton fabric is foularded in the bath so prepared, dried at 80° C. and fixed for 5 minutes at 150–160° C. in an unventilated enclosure or for 30 to 60 seconds at 180–200° C.

EXAMPLE 2

An aqueous suspension of copper phthalocyanine tetrasulphochloride obtained from 12 parts of copper phthalocyanine is treated with 5 parts of β-chloroethylamine hydrochloride with stirring, at pH 7, first for one hour at ordinary room temperature, then by heating to 50° C. in a period of half an hour and maintaining at a temperature of 50–55° C. for 3 hours, at a neutral pH. The solid is filtered off and the filter cake is suspended in water at 0° C. 12 parts of crystalline sodium sulphide are added and the mixture is maintained for 30 minutes at a temperature between 0° C. and 10° C. after which it is acidified, filtered and the solid dried at 50° C. A dyestuff is obtained which dyes cellulose fabrics according to the process indicated in Example 1 a bluish green. Analysis shows that the dyestuff contains six atoms of sulphur per molecule.

EXAMPLE 3

25 parts of the dyestuff of formula:

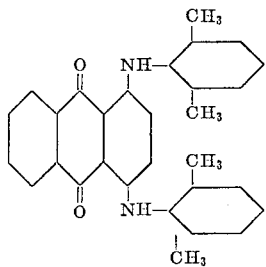

are added to 70 parts by volume of chlorosulphonic acid. The mixture is heated slowly to 70–80° C. and this temperature is maintained until evolution of HCl ceases, which takes about two hours. 20 parts by volume of thionyl chloride are added in a period of 20 minutes, the mixture is heated to 98° C. and maintained for 2½ hours at this temperature, and is then cooled, poured on to ice, and the solid filtered off and washed with ice water. The filter cake obtained is suspended in ice water, 60 parts of crystalline sodium sulphide are added, and the mixture is stirred for 40 minutes at a temperature from 0° C. to 10° C. The dyestuff is precipitated with hydrochloric acid, filtered off and dried at 50° C. A dyestuff is obtained which dyes cotton, according to the process indicated in Example 1, a navy blue shade fast to wet tests.

EXAMPLE 4

The sulphochloride is prepared of the dyestuff of formula:

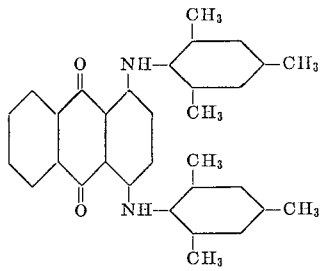

as indicated in Example 3, and it is treated with a solution of sodium sulphide. A navy blue dyestuff is obtained with properties analogous to those of the dyestuff of Example 3.

EXAMPLE 5

The sulphochloride is prepared of the dyestuff of formula:

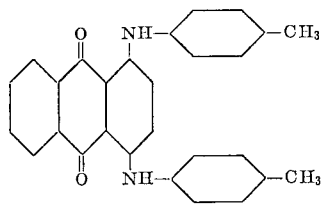

and it is treated with a solution of sodium sulphide, according to the process of Example 3. A dyestuff is obtained which dyes cellulose fabrics green.

EXAMPLE 6

25 parts of dyestuff of the formula:

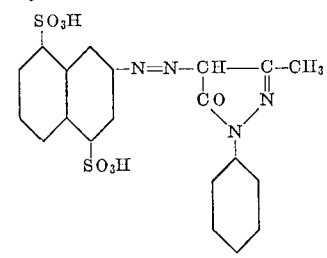

are added to 125 parts by volume of chlorosulphonic acid and the mixture is heated for four hours at a temperature of 70° C. to 75° C. 15 parts by volume of thionyl chloride are added, the mixture is heated and maintained for one and a half hours at this same temperature of 70–75° C. It is cooled to the ambient temperature, poured on to ice, the solid filtered off and wash with ice water. The filter cake of the sulphochloride thus obtained is suspended in 200 parts of a mixture of water and ice, the pH is adjusted to 7, and 40 parts of crystalline sodium suphide are added. The mixture is stirred for 30 minutes at between 0° C. and 7° C., acidified with hydrochloric acid, salted out with sodium chloride and the solid filtered off and dried at 50° C. A dyestuff is obtained which dyes cellulose according to the process indicated in Example 1 a yellow shade fast to washing.

EXAMPLE 7

If the initial dyestuff used in the preceding example is replaced by the dyestuff of the formula:

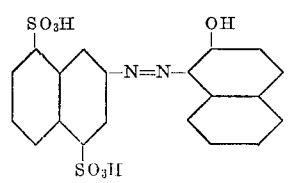

a red dyestuff is obtained which is fixed on cellulose in shades which are very fast to washing.

EXAMPLE 8

12 parts of copper phthalocyanine are added to 60 parts by volume of chlorosulphonic acid with external cooling, and the mixture is then heated to 135° C. over a period of half an hour and maintained for 4 hours at a temperature of 135–140° C. It is then cooled to 60° C., 20 parts by volume of thionyl chloride are added and the mixture is heated to 95° C. over a period of half an hour and maintained for one and a half hours at 95° C. It is cooled, poured into 250 parts of a saturated salt solution and 500 parts of ice, the solid filtered off and the filter cake washed with ice water. This cake is suspended in 500 parts of water and ice, the pH is adjusted at 0° C. to neutrality by means of a 2 N solution of sodium carbonate, and 15 parts of thiourea are added and the mixture is heated to 30–35° C. over a period of an hour while the hydrochloric acid evolved is neutralised at the same time by means of 2 N sodium carbonate. In spite of the total solution of the dyestuff, stirring is continued and the temperature is raised to 40° C., for a quarter of an hour and it is found that the pH of the solution no longer alters. It is cooled to 8–10° C., acidified by means of acetic acid, salted out with sodium chloride, and the solid filtered off and dried at 50° C. A dyestuff is obtained as a deep blue powder which dissolves very readily in water.

The application of this dyestuff is made, for example, in the following way. A foularding bath is prepared containing one part of dyestuff, 5 parts of urea, 1.5 parts of thiourea and 15 parts of water. A cotton fabric is foularded in the bath so prepared, and is dried at 80° C. and fixed for 5 minutes at 160° C. or for 1 minute at 200–220° C. After washing and soaping, a green shade which is very fast to wet tests is obtained with an almost quantitative yield.

EXAMPLE 9

25 parts of the dyestuff of the formula:

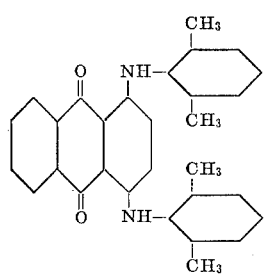

are added to 70 parts by volume of chlorosulphonic acid, and the mixture is heated slowly to 70–80° C. and maintained at this temperature until evolution of HCl has ceased, which requires about two hours. 20 parts by volume of thionyl chloride are added over a period of 20 minutes, and the mixture is heated to 98° C., maintained for 2½ hours at this temperature, cooled, poured to ice, and the solid filtered off and washed with ice water. The filter cake obtained is suspended in ice water, and 40 parts of thiourea are added, then the mixture is heated to 50° C. over a period of two hours while maintaining the pH at neutrality by means of 2 N sodium carbonate. At the end of this time the dyestuff has dissolved in the water. The solution is maintained a further half hour at this temperature, then cooled and acidified with acetic acid. It is then salted out with sodium chloride, and the solid filtered off and dried. A deep blue powder is obtained which dyes cellulose fabrics, according to the process of Example 8, a navy blue shade fast to wet tests and with a very good yield.

EXAMPLE 10

25 parts of the dyestuff of the formula:

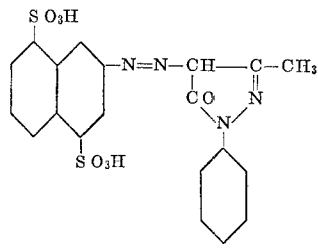

are added to 125 parts by volume of chlorosulphonic acid and the mixture is heated for four hours at a temperature of 70° C. to 75° C. 15 parts by volume of thionyl chloride are added and the mixture is heated and maintained for 1½ hours at this same temperature of 70–75° C. It is then cooled to the ambient temperature, poured on to ice, and the solid filtered off and washed with ice water. The filter cake of the sulphochloride thus obtained is suspended in 200 parts of a mixture of water and ice, the pH is adjusted to 7, and 20 parts of thiourea are added. The mixture is heated so that the temperature rises to 30–32° C. over a period of half an hour, while the pH of the solution is kept at neutrality by means of 2 N sodium carbonate. At the end of this time the dyestuff becomes completely soluble in the water. The reaction mixture is heated for a further quarter of an hour at 35–40° C. and it is found that the pH of the solution no longer alters. It is cooled to 8–10° C. acidified with acetic acid and salted out with sodium chloride, and the solid is filtered off and dried at 50° C. A dyestuff is obtained which dyes cotton, according to the process of Example 8, a yellow shade which is very fast to wet tests.

EXAMPLE 11

20 parts of a condensation product of aminoazobenzene with aniline known by the name of Base of Induline B, are slowly introduced into 75 parts by volume of chlorosulphonic acid. The temperature is raised progressively to 125–135° C. and maintained at this level for 4 hours. The mixture is cooled to 50–60° C. and 40 parts by volume of thionyl chloride are added in 15 minutes. The temperature is raised to 95–98° C. and maintained at this for 3 hours. After cooling, the mass is poured on to a mixture of crushed ice and 250 parts by volume of a saturated salt solution so that the temperature does not exceed 0° C. The solid is filtered off and washed quickly with ice water, and is thoroughly drained.

The filter cake is made into a paste in 400 parts of water and crushed ice and 45 parts of thiourea are added. The pH of the mixture is adjusted to 6.5–6.9 by the addition of a solution of sodium carbonate, and the mixture is stirred at 0–5° C. for 6 hours while maintaining the pH in this region by the progressive introduction of a solution of sodium carbonate. When the pH no longer tends to fall, 300 parts of salt are added and the mixture is made acid by the addition of hydrochloric acid. The precipitate is filtered off and drained. It is taken up in 400 parts of water and sodium carbonate is added until the pH is 7.8. The solution is brought to dryness by distillation under vacuum or by atomisation.

The product obtained is very soluble in water and when applied to the directions in Example 8, provides on cellulose fabric black shades which are very fast to wet tests and to light.

EXAMPLE 12

15 parts of the dyestuff of the formula:

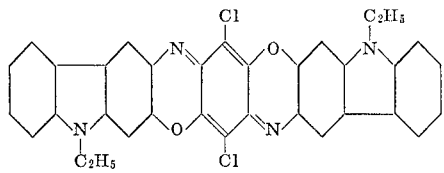

are slowly introduced into 100 parts by volume of chlorosulphonic acid. The mixture is heated for 4½ hours at 120–130° C. cooled to 50° C., and 30 parts by volume of thionyl chloride are added and it is heated for 3 hours at 95–98° C. It is allowed to cool and poured on 250 parts by volume of a saturated salt solution containing crushed ice in order that 0° C. is not exceeded. The solid is filtered off, washed with ice water and thoroughly drained. The filter cake is made into a paste in 300 parts of water and crushed ice, 40 parts of thiourea are added, and the mixture is stirred for 2½ hours while maintaining the temperature between 0° C. and 5° C. and adjusting the pH to a value between 6.3 and 6.5 by the addition of a solution of sodium carbonate. After stirring for 16 hours, the final pH is 7.3, and sodium chloride is added until the dyestuff is almost completely precipitated. The precipitate is filtered off, drained and dried at 50° C.

The dyestuff obtained dyes cotton, under the conditions described in Example 8, in violet blue shades having excellent fastness to light and to wet tests.

What is claimed is:

1. A water soluble thiosulphonic anthraquinone dyestuff obtained by reacting a member selected from the group consisting of 1,4-bis-(2',6'-dimethylphenylamino)-anthraquinone sulphochlorides and 1,4-bis-(2',4',6'-trimethylphenylamino-anthraquinone sulphochlorides in an aqueous medium at a temperature between 0° C. and 100° C. with a member selected from the group consisting of alkali metal sulphides, alkali metal hydrosulphides and thiourea.

2. Water-soluble dyestuffs according to claim 1 wherein the treatment is effected at between 0° C. and 30° C. with an aqueous solution of an alkali metal sulphide.

3. Water-soluble dyestuffs according to claim 2 obtained under such conditions that there is always a slight excess of sulphide in the solution.

4. Water-soluble dyestuffs according to claim 2 in which the salt obtained is converted to the free acid by acidification.

5. Water-soluble dyestuffs according to claim 3 in which the salt obtained is converted to the free acid by acidification.

6. A water soluble thiosulphonic anthraquinone dyestuff according to claim 1 obtained by reacting a member selected from the group consisting of 1,4-bis-(2',6'-dimethylphenylamino) anthraquinone sulphochlorides and 1,4-bis-(2',4',6-trimethylphenylamino) anthraquinone sulphochlorides with an aqueous solution of thiourea at between 0° C. and 60° C. and neutralizing the acid liberated by means of an alkali.

References Cited

UNITED STATES PATENTS

| | | | |
|---|---|---|---|
| 3,226,395 | 12/1965 | Schimmelschmidt et al. | 260—163X |
| 3,236,860 | 2/1966 | Schultheis et al. | 260—314.5 |
| 3,361,758 | 1/1968 | Geselbracht et al. | 260—314.5 |

FLOYD D. HIGEL, Primary Examiner

U.S. Cl. X.R.

8—41, 50, 51; 260—162, 195, 246, 267, 314.5, 366, 378